United States Patent Office 3,369,494
Patented Feb. 20, 1968

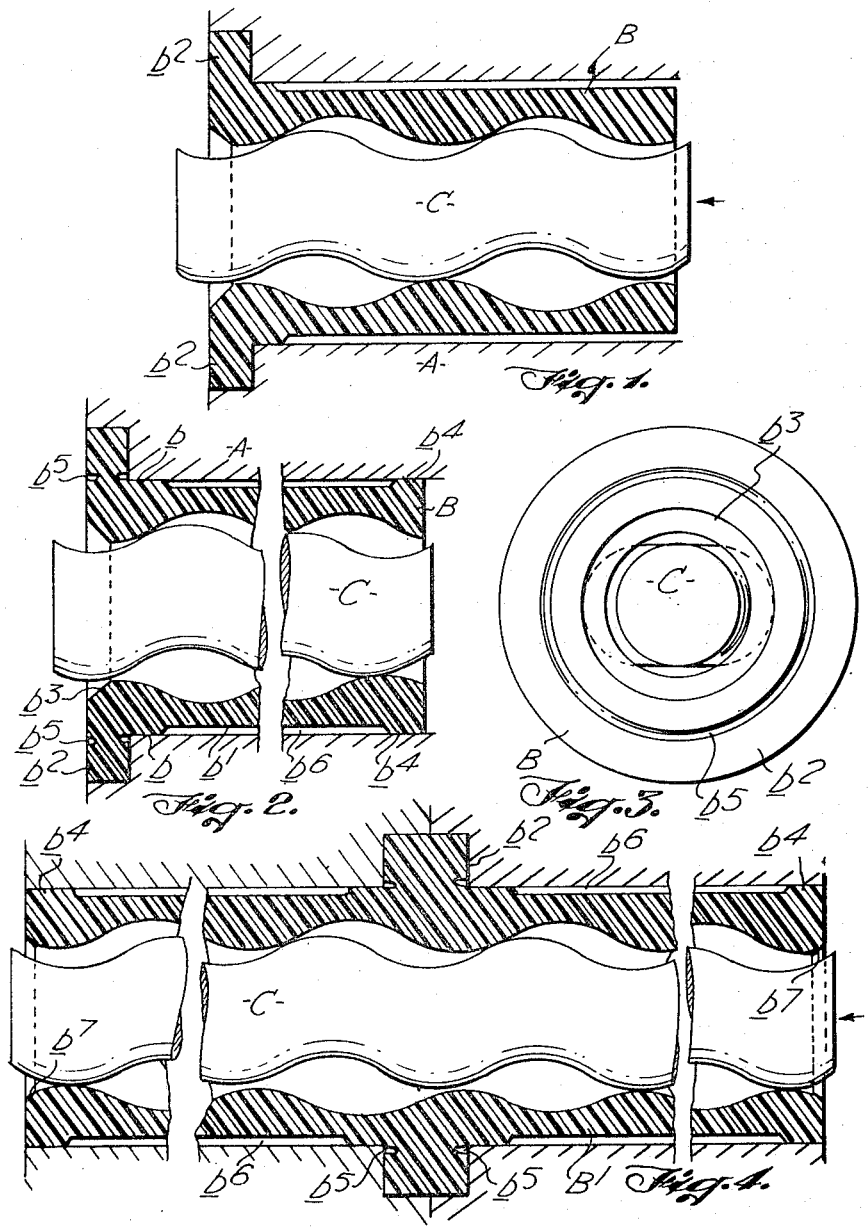

3,369,494
PUMPS
Robert M. Seddon, Knaresborough, England, assignor to Unitex Limited, Knaresborough, England, a company of Great Britain
Filed Oct. 18, 1965, Ser. No. 497,339
Claims priority, application Great Britain, Oct. 30, 1964, 44,283/64
5 Claims. (Cl. 103—117)

ABSTRACT OF THE DISCLOSURE

A mono pump comprising a spiral rotor rotating within the tortuous bore of a stator of elastomeric material such as polyurethane mounted in a surrounding rigid housing bore. An external flange anchors the stator against bodily relative movement within the housing bore, but the stator is free for axial expansion relative to the flange. A working intermediate length of the stator has a loose peripheral fit with the housing bore, providing a surrounding small clearance space within the housing bore, and the radially deformable stator walls are sufficiently thin to transmit fluid pressure to this space so that the stator is self-pressurized during pumping.

---

This invention relates to improvements in pumps of the type known as a mono pump in which a rotor is mounted in an elastomeric stator carried in a housing or body.

It has been proposed to mount the stator as a close fit in the housing which prevents the periphery of the stator and, therefore the bore therein from expanding uniformly in radial directions.

In the installation of the pumps an interference fit is provided between the central rotor and the bore of the stator and because of the lack of space for material displacement the pressure between stator and rotor can be high, this pressure increasing with the stiffness of the material used for the manufacture of the stator.

According to the invention the stator is mounted in the housing or body with a clearance between the periphery of the stator and the housing or body, the stator being retained in position by a flange on the stator.

The invention will be described with reference to the accompanying drawings:

FIG. 1 is a longitudinal section of one form of stator.
FIG. 2 is a similar section partly broken away of a modified arrangement.
FIG. 3 is an end view of FIG. 2.
FIG. 4 is a longitudinal section partly broken away of a further arrangement. A pump housing or body A is provided with a stator B formed with a minor diameter or shoulder $b$ as a clearance fit in the housing A, and with a barrel diameter $b^1$ as a loose fit in the housing thus allowing the stator to expand longitudinally and radially (FIG. 1). The stator B is formed with a flange $b^2$ at the inlet end to anchor the stator in the housing or body A.

The pump pressure is applied by a rotor C in the direction of the arrow and as a result of this pressure the stator can deform both longitudinally and radially.

The stator B is formed with a tortuous bore to accommodate a spiral rotor $C^1$ which feeds the material through the bore.

In the case of a single stage stator B a heavy chamfer $b^3$ is incorporated at the mouth of the bore in the stator at the flange end to prevent the extreme edge from being bent inwards, since the flange when compressed during assembly into the housing or body A tends to reduce the bore at the extreme end and due to the direction of flow of the material being pumped, the edge if not chamfered may be bent inwardly.

The clearance between the housing or body A and the stator B results in a more efficient pumping and reduced wear. Should a hard object be dropped into the pump the stator B will deform locally to permit this hard object to pass through the pump with a minimum damage to both the stator B and the rotor C. Furthermore some materials being pumped contain hard objects, an example of which are the seeds in jam.

In some cases (FIG. 2) it is desirable to locate, radially the end of the stator coupling and in such a case the stator barrel diameter may be increased for a short length $b^4$ to approximately the inside diameter of the housing or body A. In this construction similarly to that herein before described the pressure from the pump is transmitted to the outside of the stator B rendering the system self pressurising, whereby higher pumping pressures with a single stage can be obtained than were possible with previous pumps employing a double stage.

The housing or body A is so shaped that stator B does not cause an undue increase of pressure on the rotor C and at the same time acts as a seal for the cavity $b^6$ which is created between the major length of the stator B and the stator housing A. If the said cavity $b^6$ is filled with a viscous material such as oil or grease a resilient cushion is provided.

An undercut $b^5$ may be provided in the flange $b^2$ to provide a space into which the material of the stator may more readily be deformed.

A double stage stator $B^1$ is shown in FIG. 4 provided with a central flange $b^2$ and a further shoulder $b^4$ to provide those cavities $b^6$ and therefore the tendency of the flow to deform the ends of the stator is reduced and a smaller chamfer $b^7$ is required. The bore may be chamfered at both ends in order that the stator $B^1$ may be reversed.

The undercut $b^5$ on the flange may be provided.

The stators B, $B^1$ may be formed of any suitable elastomeric materials, but for optimum performance it is preferred to use polyurethane.

What I claim is:

1. A mono pump comprising a rigid housing having a bore, a radially expansible and contractible stator of elastomeric material mounted within said housing bore and having a major working length portion of its outer periphery loosely fitted within said housing bore so as to provide a surrounding uniform small clearance space within said housing bore, said working length periphery being of uniform diameter from end to end, an external flange in said stator extending into a recess in said housing for retaining the stator longitudinally within said housing bore while providing for unrestrained axial expansion of said stator within the housing bore relative to said flange, means defining a tortuous fluid conducting bore through said stator, and a spiral rotor rotatably mounted within said stator bore, the wall of said stator being sufficiently deformable during pumping that pump pressure within the stator bore is transmitted through it to said space whereby the stator is both internally and externally self-pressurized during pumping.

2. The pump defined in claim 1, wherein said rotor periphery is annularly sealed with said housing bore at opposite ends of said working length space.

3. The pump defined in claim 1, wherein said stator has an annular chamfer surrounding the fluid inlet end of said stator bore.

4. The pump defined in claim 1, wherein said stator is an integral polyurethane element.

5. The pump defined in claim 1, wherein said clearance space is sealed with the housing bore at opposite ends and contains a viscous fluid providing a resilient cushion for radial expansion of said stator.

References Cited

UNITED STATES PATENTS

| | | | |
|---|---|---|---|
| 2,290,137 | 7/1942 | Aldridge | 230—137 |
| 2,545,626 | 3/1951 | Moineau | 103—117 |
| 2,733,854 | 2/1956 | Chang | 230—137 |
| 2,765,114 | 10/1956 | Chang | 103—117 |
| 2,874,643 | 2/1959 | Bourke | 103—117 |
| 2,879,920 | 3/1959 | Davies | 103—117 |
| 3,011,445 | 12/1961 | Bourke | 103—117 |
| 3,084,631 | 4/1963 | Bourke | 103—117 |

DONLEY J. STOCKING, *Primary Examiner.*

WILBUR J. GOODLIN, *Examiner.*